US010612692B2

(12) United States Patent
Cowie et al.

(10) Patent No.: US 10,612,692 B2
(45) Date of Patent: Apr. 7, 2020

(54) PIPELAY SYSTEM, APPARATUS AND METHOD OF USE (71) Applicant: Cortez Subsea Limited, Aberdeen (GB)

(72) Inventors: Alasdair Cowie, Aberdeen (GB); Charles Hughes, Aberdeen (GB)

(73) Assignee: CORTEZ SUBSEA LIMITED, Aberdeen (GB)

( * ) Notice: Subject to any disclaimer, the term of this patent is extended or adjusted under 35 U.S.C. 154(b) by 0 days.

(21) Appl. No.: 14/890,221

(22) PCT Filed: May 9, 2014

(86) PCT No.: PCT/GB2014/051429
§ 371 (c)(1),
(2) Date: Nov. 10, 2015

(87) PCT Pub. No.: WO2014/181125
PCT Pub. Date: Nov. 13, 2014

(65) Prior Publication Data
US 2016/0084407 A1 Mar. 24, 2016

(30) Foreign Application Priority Data

May 10, 2013 (GB) .................... 1308455.3
May 13, 2013 (EP) .................... 13167501

(51) Int. Cl.
F16L 1/20 (2006.01)
F16L 1/16 (2006.01)
F16L 1/235 (2006.01)
F16L 3/16 (2006.01)
F16L 3/26 (2006.01)
B63B 35/03 (2006.01)

(52) U.S. Cl.
CPC ............ F16L 1/207 (2013.01); B63B 35/03 (2013.01); F16L 1/161 (2013.01); F16L 1/205 (2013.01); F16L 1/235 (2013.01); F16L 3/16 (2013.01); F16L 3/26 (2013.01)

(58) Field of Classification Search
CPC ............ B63B 35/03; F16L 1/205; F16L 1/207
See application file for complete search history.

(56) References Cited

U.S. PATENT DOCUMENTS 4,061,231 A 12/1977 Birdwell
4,095,825 A 6/1978 Butler
7,189,028 B1 3/2007 Teresio
(Continued)

FOREIGN PATENT DOCUMENTS

EP 1916379 4/2008
WO WO2011/037459 3/2011

OTHER PUBLICATIONS

International Search Report and Written Opinion for PCT/GB2014/051429 dated Aug. 22, 2014.

Primary Examiner — Tara Mayo-Pinnock
(74) Attorney, Agent, or Firm — Workman Nydegger (57) ABSTRACT The invention provides a modular system for use in an offshore pipelay operation, and apparatus and a method of use. The system comprises a plurality of pipe storage modules, each comprising a rack for accommodating a plurality of pipeline sections. The pipe storage modules are configured to be assembled together to form an integrated structure on a deck of a vessel.

16 Claims, 10 Drawing Sheets (56) References Cited

U.S. PATENT DOCUMENTS

2003/0091395 A1 5/2003 Stockstill
2011/0243689 A1* 10/2011 Pose .................. B63B 27/02
　　　　　　　　　　　　　　　　　　　　　414/137.1
2013/0272821 A1* 10/2013 Ardavanis ............ B25J 15/0047
　　　　　　　　　　　　　　　　　　　　　414/137.9

* cited by examiner

PIPELAY SYSTEM, APPARATUS AND METHOD OF USE

CROSS-REFERENCE TO RELATED APPLICATIONS

This application claims priority to and the benefit of PCT Application No. PCT/GB2014/051429, filed May 9, 2014, entitled "PIPELAY SYSTEM, APPARATUS AND METHOD OF USE", which claims the benefit of and priority to Great Britain Patent Application No. 1308455.3, filed May 10, 2013, and Great Britain Patent Application No. 13167501.9, filed May 13, 2013, each of which is incorporated herein in its entirety.

The present invention relates to a pipelay system, apparatus and method of use. In particular, the present invention relates to a modular system for offshore pipelay operations, apparatus for forming such system, and a method of use. The invention in at least some of its aspects has particular application to mechanical interference fit pipelay technologies.

BACKGROUND TO THE INVENTION

In the field of offshore pipelay, it is known to form a pipeline by assembling a pipeline sections on a vessel and deploying the assembled pipeline from the vessel to the seabed. Typically, a pipelay operation will be carried out from a dedicated pipelay vessel. The pipelay vessel stores and transports a number of pipeline sections, which are joined together on an assembly line or firing line and launched from the vessel. Where the pipeline is formed on the vessel in a generally vertical orientation, the system is referred to as a J-lay system. Where the pipeline is formed in a generally horizontal orientation, the pipeline operation is referred to as S-lay system. J-lay or S-lay pipelay systems include pre-assembly lines in which individual pipeline sections are joined into a multiple length pipeline section, which is then joined to the main pipeline on an assembly line.

One conventional method of joining pipe sections is welding. Welding methods are reliable and well-understood, but are time consuming and expensive due to the time required to complete and inspect each weld. To mitigate this, welding pipelay systems typically use a pre-assembly line in which multiple welds are performed concurrently at weld stations positioned at axially separated locations. The vessel therefore requires a large deck to accommodate the length of the pre-assembly line which is required to make the process more efficient.

WO 2011/037459 describes an offshore pipelay vessel used in S-lay installation operations. The vessel comprises a pre-assembly line for forming multiple length pipe sections, an inspection station and a main assembly line. A conveyor system transports single pipe sections or multiple pipe sections from a pipe elevator. The system of WO 2011/037459 is configured such that the assembly line may receive single pipe sections directly from the pipe elevator, or multiple pipeline sections via the pre-assembly line and inspection station.

The vessel of WO 2011/037459 is stated to provide efficient and versatile handling of pipe sections. However, the configuration described is only suitable for a dedicated pipelay vessel due to the complexity of the conveyor system.

An alternative pipe connection technique is a mechanical interference fit pipe-joining method. Mechanical interference fit methods have the advantage that each joint can be made up in a fraction of the time required to create a weld joint. Examples of mechanical interference fit pipe systems include those described in U.S. Pat. Nos. 4,095,825, 4,064,619, 4,120,083, and 4,091,648 and marketed by Zap-Lok Pipeline Systems Inc. as the ZAP-LOK pipeline system.

Mechanical interference fit systems are able to provide benefits in offshore pipelay installation methods by eliminating the requirement for x-ray inspection, eliminating field joint coatings, increasing corrosion protection, and ultimately increasing construction speed. However, existing pipelay vessels are not configured to utilise the benefits of mechanical interference fit pipelay technologies. Current methods of configuring existing pipelay vessels for alternative connection technologies are not financially viable.

It is therefore amongst the aims and objects of the invention to provide a pipelay system which offers benefits in offshore applications of mechanical interference fit pipelay technologies.

More generally, it is amongst the aims and objects of the invention to provide a pipelay system, apparatus and/or method of use which overcomes one or more deficiencies or drawbacks associated with conventional pipelay systems.

It is amongst the aims of at least one aspect of the invention to provide a pipelay system which is modular; which may be readily transported onshore and installed on a vessel; and/or which is suitable for application to a range of vessel types and sizes.

Other aims and objects of the invention will become apparent from reading the following description.

SUMMARY OF THE INVENTION

According to a first aspect of the invention, there is provided a modular system for use in an offshore pipelay operation, the system comprising:

a plurality of pipe storage modules, each pipe storage module comprising a rack for accommodating a plurality of pipeline sections;

wherein the pipe storage modules are configured to be assembled together to form an integrated structure on a deck of a vessel.

It should be understood that the term "vessel" used in the context of this specification is intended to include powered and unpowered vessels including barges, and that the invention is applicable to barge-based pipelay operations.

By providing the pipe storage modules as prefabricated functional modules ready for assembly into an integrated structure on a deck of a vessel, the modular system is suitable for application to a wide range of vessel types and deck sizes.

Preferably, one or more of the pipe storage modules is configured to be transported overland by road and/or rail. One or more of the pipe storage modules may be configured to be transported in a standard shipping container. The pipe storage modules may therefore be conveniently transported to a vessel location (docked or offshore) and assembled together with other pipe storage module on the deck of the vessel to form the integrated structure, without requiring that the vessel be brought to a specific location for a dedicated installation operation.

The system preferably comprises an assembly line for the connection of one or more pipeline sections. The assembly line is preferably supported by the integrated structure. More preferably, the main pipeline is configured to be deployed from the assembly line (i.e. the assembly line forms the firing line for the offshore pipeline operation).

Preferably, a pipe storage module comprises a plurality of uprights for laterally restraining pipe sections on the rack. The uprights may be height-adjustable.

Preferably, one or more pipe storage modules is adjustable in length (a direction parallel to the usual direction of a longitudinal axis of pipe sections accommodated on the module) and/or width (a direction perpendicular to the usual direction of the longitudinal axis of pipeline sections accommodated in the module). Preferably, one or more pipe storage modules have an adjustable height. The pipe storage modules may therefore be adjusted in size to optimise the use of deck space on the vessel.

The modular system may comprise a plurality of modular beams configured to be assembled into a central modular beam structure of the integrated structure, and the central modular beam structure may be arranged to extend over the majority of the length of the deck. The central modular beam structure may be arranged to extend on either side of the assembly line, and may be secured to the deck of the vessel via seafastening elements connected to a main deck principal frame.

Preferably, the integrated structure is a load-bearing structure, such that a load on one module or modular beam is distributed through the integrated structure. By providing an integrated structure which is load bearing, the system may utilise existing tie-down points on the deck of the vessel, reducing the requirements for welding and/or optimising welding of the structure to the deck. The system may therefore be removably secured to the deck of the vessel.

Preferably, the integrated structure comprises one or more base foundations configured to accommodate and/or locate the pipeline connection equipment. The pipeline connection equipment may comprise one or more machines for forming a mechanical interference fit connection between pipeline sections. The pipeline connection equipment may comprise equipment selected from the group consisting of: one or more tensioners, one or more corrosion protection stations, and one or more contingency cut-out stations.

Alternatively, or in addition, the system may be configured for a welded pipeline connection and pipelay system.

Preferably, the integrated structure comprises a plurality of pipe storage modules arranged in series parallel to an assembly line. The integrated structure may comprise one or more pipe storage modules arranged in series on a first side of an assembly line, and may further comprise one or more pipe storage modules located on a second, opposing side of the assembly line. The assembly line may therefore be located between two or more pipe storage modules.

The plurality of pipe storage modules may comprise at least one primary storage module. The plurality of pipe storage modules may comprise at least one end storage module.

Preferably, the integrated assembly comprises a stinger assembly. More preferably, the stinger assembly comprises a stinger foundation, located at a pipelay end of the assembly line. The stinger foundation preferably forms a part of the integrated structure, such that a load on the stinger assembly is transferred to the integrated structure on the deck of the vessel.

Preferably, the stinger assembly comprises an A-frame. The stinger assembly may be moveable between the first, upper transit position and a second lower, pipelay position.

Each pipe storage module may comprise pipe lifting equipment. Preferably, the pipe lifting equipment is configured to lift a pipe section accommodated on a rack of the pipe storage module.

Preferably, the primary pipe storage module comprises a conveyor assembly, configured to move a pipeline section towards a pipeline connection location. Preferably the conveyor assembly comprises a powered conveyor mechanism. The conveyor assembly may comprise rollers.

The conveyor assembly of a pipe storage module may be configured to receive a pipe section from a rack of the pipe storage module. Alternatively or in addition, the conveyor assembly may be configured to receive a pipe section from a conveyor assembly of an adjacent pipe storage module.

Preferably, an end storage module is located at the end of the integrated structure which opposes the pipelay end of the system.

In a preferred embodiment, an end storage module comprises a feed table configured to move a pipeline section towards the assembly line. Preferably, the feed table is configured to move the pipe end section into the assembly line in a direction perpendicular to the assembly line. Preferably, the feed table facilitates lateral movement of a pipeline section into the assembly line. The feed table may comprise a securing mechanism for securing a pipeline section on the feed table. The feed table may comprise a feed mechanism for automatically moving a pipeline section from the end storage module to the assembly line. The feed mechanism may comprise a rotating mechanism for moving the pipeline section towards the assembly line.

Preferably, the end storage module comprises a secondary storage area, and the end storage module may comprise a mechanism for moving a rejected pipe section to the secondary storage area.

According to a second aspect of the invention, there is provided a vessel comprising: a deck; and a modular system according to the first aspect of the invention installed on the deck.

Embodiments of the second aspect of the invention may include one or more features of the first aspect of the invention or its embodiments, or vice versa.

According to a third aspect of the invention, there is provided a pipe section storage apparatus for use in an offshore pipelay operation, the storage apparatus comprising:
a base frame; and
a rack for accommodating a plurality of pipeline sections;
wherein the storage apparatus is configured to be assembled with another storage apparatus on the deck of a vessel to form an integrated structure.

Preferably, the base frame of the pipe section storage apparatus is configured to at least partially bear a load from a storage apparatus with which it is assembled.

Embodiments of the third aspect of the invention may include one or more features of the first or second aspects of the invention or their embodiments, or vice versa.

According to a fourth aspect of the invention, there is provided a method of installing a pipeline from an offshore vessel, method comprising:
providing a plurality of pipe storage modules on the deck of a vessel, the pipe storage modules accommodating a plurality of pipe sections;
moving a pipe section from a storage rack of a first pipe storage module to a conveyor assembly of the first pipe storage module;
moving the pipe section from the first pipe storage module to the conveyor assembly of a second pipe module;
moving the pipe section into an assembly line;
assembling the pipe section into a pipeline;
laying the pipeline from the vessel to a subsea location.

Preferably, the method comprising moving the pipe section from a storage rack of a first pipe storage module to a conveyor assembly of the first pipe storage module using a powered lifting apparatus. Preferably the powered lifting apparatus is a part of the first pipe storage module.

Preferably the method comprises assembling the pipe section into a pipeline using a mechanical interference fit connection method.

Embodiments of the fourth aspect of the invention may comprise features corresponding to the preferred or optional features of the first, second or third aspects of the invention or their embodiments, or vice versa.

According to a fifth aspect of the invention, there is provided a method of installing an offshore pipelay system on a vessel, the method comprising:

providing a plurality of pipe storage modules at a vessel location;

assembling the plurality of pipe storage modules on a deck of the vessel to form an integrated structure;

wherein the integrated structure comprises a load-bearing structure for the offshore pipelay system.

The method may comprise removably attaching the plurality of pipe storage modules to one another to form the integrated structure, for example by bolts, flanges and/or pins. The method may comprise securing the integrated structure to the deck of the vessel via a plurality of tie-down points on the deck of the vessel. Preferably the method comprises securing the integrated structure to the vessel with reduced welding requirements, or optimised welding locations. In some embodiments, there may be minimal or no welding of the integrated structure to the deck of the vessel.

Embodiments of the fifth aspect of the invention may comprise features corresponding to the preferred or optional features of the first to fourth aspects of the invention or their embodiments, or vice versa.

According to a sixth aspect of the invention, there is provided a method of installing a pipelay system on a vessel, the method comprising:

transporting a plurality of pipe storage modules overland to a vessel location; assembling the plurality of pipe storage modules on a deck of the vessel to form an integrated structure;

wherein the integrated structure comprises a load-bearing structure for the pipelay system.

Preferably the method comprises transporting a plurality of pipe storage modules by rail or road to the vessel location.

Embodiments of the sixth aspect of the invention may comprise features corresponding to the preferred or optional features of the first to fifth aspects of the invention or their embodiments, or vice versa.

According to a seventh aspect of the invention, there is provided a method of configuring an offshore pipelay system, the method comprising:

providing a vessel comprising an offshore pipelay system on a deck of the vessel, the offshore pipelay system comprising a plurality of racks for accommodating a plurality of pipeline sections;

uninstalling the offshore pipelay system to form a plurality of pipe storage modules.

Preferably the method comprises transporting the plurality of pipe storage modules overland to a second vessel location; and assembling the plurality of pipe storage modules on a deck of the second vessel to form an integrated structure on the second vessel.

The integrated structure comprises a load-bearing structure for the offshore pipelay system.

Preferably the method comprises transporting the plurality of pipe storage modules by rail or road to the second vessel location. The method may comprise storing the plurality of pipe storage modules prior to assembling the plurality of pipe storage modules on the deck of the second vessel.

Embodiments of the seventh aspect of the invention may comprise features corresponding to the preferred or optional features of the first to fifth aspects of the invention or their embodiments, or vice versa.

According to an eighth aspect of the invention, there is provided a protective mattress for a layered arrangement of pipe sections, the protective mattress comprising a first surface configured to be disposed over a first layer of pipe sections and a second surface configured to support a second layer of pipe sections.

The protective mattress may comprise a plurality of lateral slats configured to be disposed perpendicular to a plurality of pipe sections in the first layer. The lateral slats may comprise wood.

The protective mattress may comprise a plurality of joining members which link the plurality of lateral slats. The joining members may be flexible, and may comprise a rope or cord. Preferably the joining members comprise polypropylene rope.

The second surface may be configured to enable pipe sections in the second layer to roll in a direction substantially perpendicular to the longitudinal direction of the pipe sections.

Embodiments of the eighth aspect of the invention may comprise features corresponding to the preferred or optional features of the first to seventh aspects of the invention or their embodiments, or vice versa.

According to a ninth aspect of the invention, there is provided a pipe storage apparatus comprising a layered arrangement of pipe sections and a protective mattress according to the eighth aspect of the invention.

Embodiments of the ninth aspect of the invention may comprise features corresponding to the preferred or optional features of the first to eighth aspects of the invention or their embodiments, or vice versa.

According to a tenth aspect of the invention, there is provided a pipelay system comprising a pipe storage apparatus according to the ninth aspect of the invention.

Embodiments of the tenth aspect of the invention may comprise features corresponding to the preferred or optional features of the first to ninth aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1A:
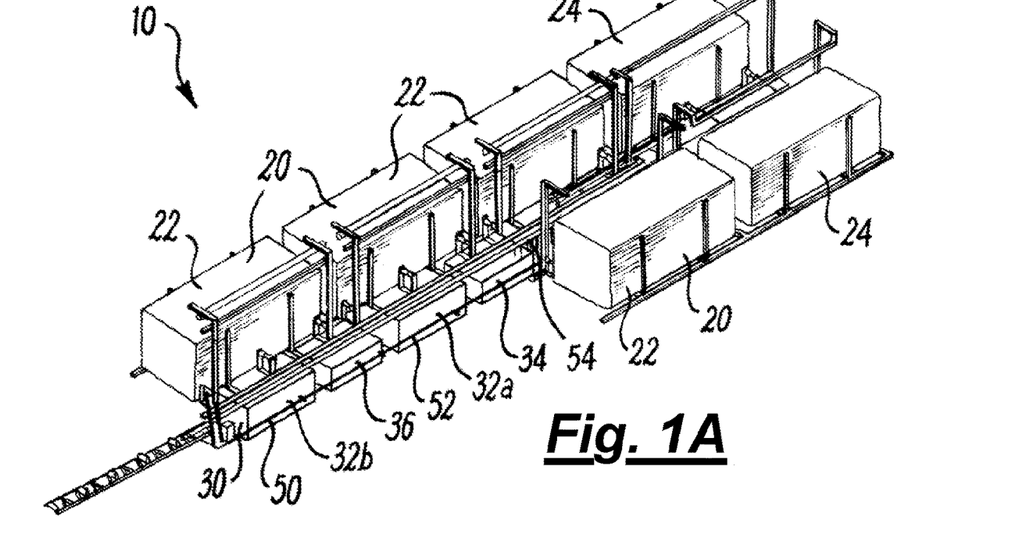
FIG. 1A is an isometric view of a modular pipelay system according to a first embodiment of the invention.
Figure 1B:
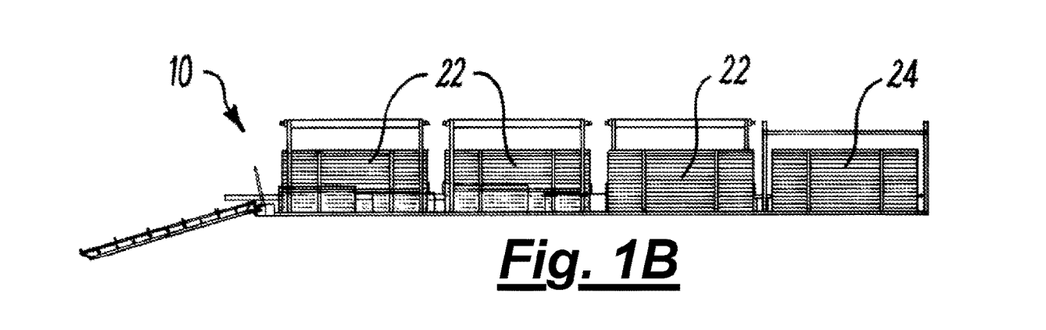
FIG. 1B is a side elevation of the modular pipelay system of FIG. 1A.
Figure 1C:
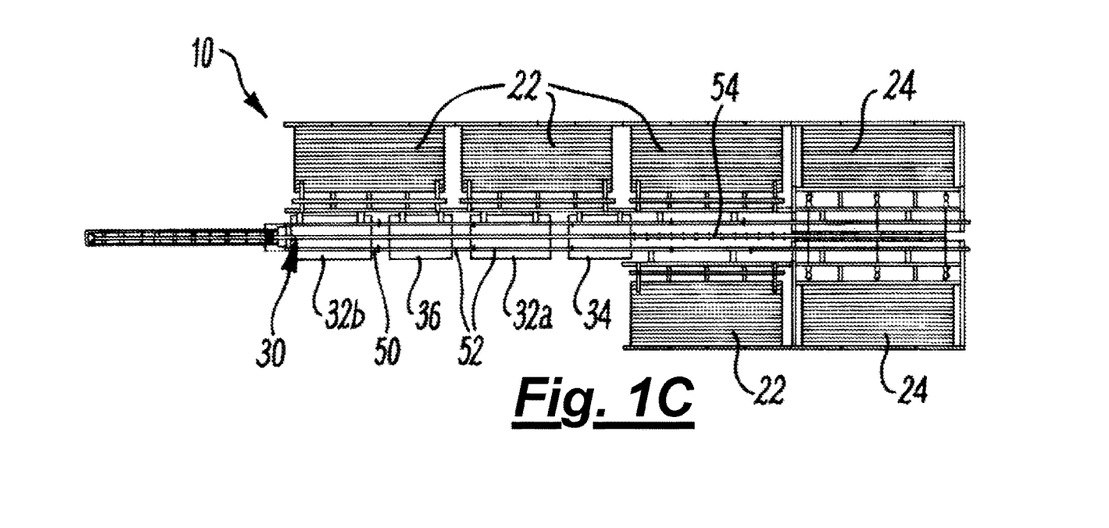
FIG. 1C is a plan view of the modular pipelay system of FIGS. 1A and 1B.
Figure 2:
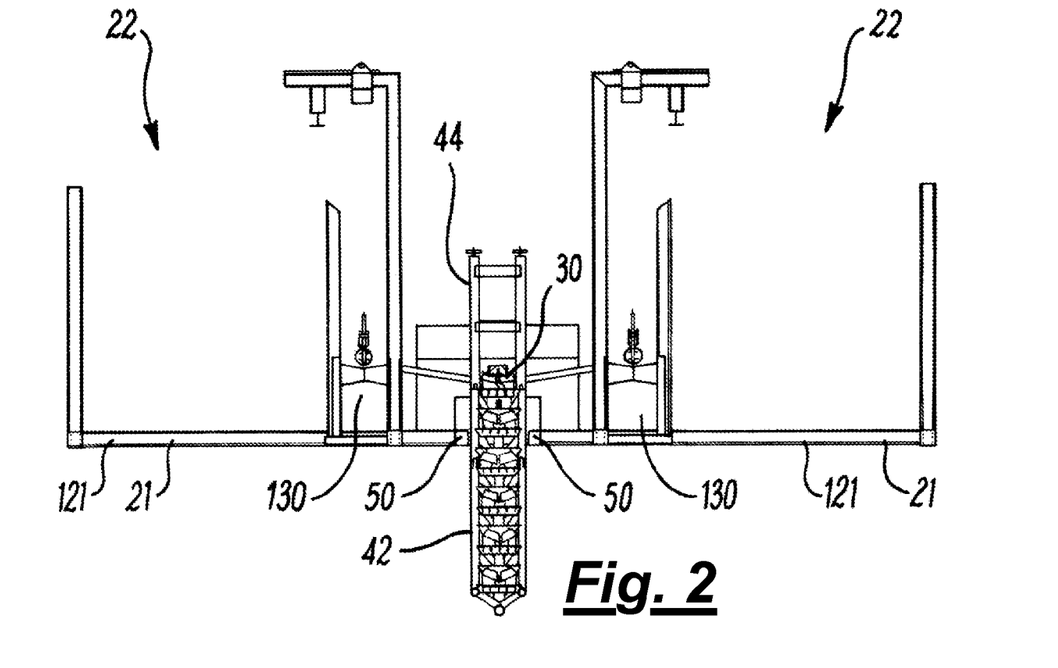
FIG. 2 is an end view of showing components of the modular pipelay system of FIG. 1.
Figure 10:
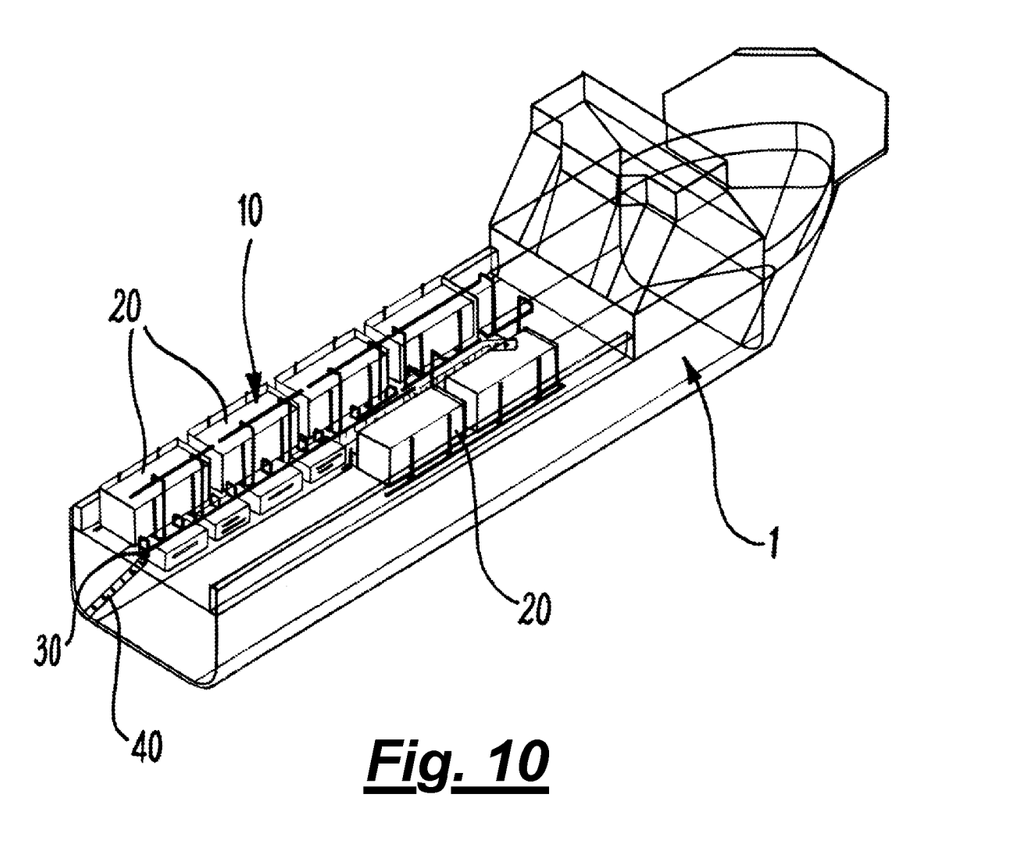
FIG. 10 is a schematic representation of the modular system of FIG. 1 in situ on a medium-sized vessel.

Referring to firstly to FIGS. 1A to 10, FIG. 2 and FIG. 10, there is shown generally at 10, a modular pipeline system in accordance with embodiment of the invention. FIGS. 1A to 10 respectively show the system 10 in isometric, side and plan views, and FIG. 2 shows the system 10 from an aft end, and FIG. 10 shows the system 10 in situ on the deck of a vessel 1. The system 10 comprises a number of pipe storage modules 20 assembled together to form an integrated structure on the deck of the vessel.

In this embodiment, the system comprises six pipe storage modules 20. A first series of pipe storage modules 20 is arranged longitudinally on one side of an assembly line 30. A second series of pipe storage modules 20 is arranged longitudinally on an opposing side of the assembly line 30. Each pipe storage module 20 comprises a base frame 21 formed from steel beams 23. The steel beams 23 comprise bolted flange connections to enable adjacent pipe storage modules to be assembled together.

The four aft-most modules on the vessel are primary storage modules 22 (shown in more detail in FIG. 4) which will be described in more detail below. The two foremost pipe storage modules 20 are end storage modules 24 (shown more prominently in FIGS. 7A to 7C) and are also described in more detail below.

The system 10 comprises a central modular beam structure, shown generally at 50, consisting of modular beams 52 longitudinally arranged on either side of the assembly line 30. The beams 52 of the central modular structure are connected together by bolted flanges, and are secured to the deck of the vessel via seafastening elements connected to the main deck principal frame. In this embodiment, two parallel central beams are provided, one on either side of the assembly line, and extend over the majority of the length of the deck. This enables the central modular beam structure to be connected to the deck at multiple pre-existing points on the deck, facilitating optimised welding configurations which may avoid dedicated welds that could impede removal of the beams.

The pipe storage modules 20 are connected to the central modular beam structure 50 by transverse beams, and together, the pipe storage modules 20 and the central modular beam structure form the integrated structure on the deck of the vessel. The integrated structure is load-bearing, such that loads experience by one of the modules 20 or by the central modular beam structure is distributed through the integrated structure.

The central module structure comprises base foundations for mounting pipelay equipment in the system 10 on the main vessel deck. The system 10 is configured as a mechanical interference fit for the pipeline system, and the pipeline equipment comprises a pair of tensioners 32a, 32b; a pipeline connection machine 34, and an auxiliary station 36.

The tensioners 32a, 32b control the pipeline tension during pipelay operations, and are selected according to pipe dimensions, pipe grade and wall thickness, water depth and environmental factors. In this embodiment, two tensioners are used in the system to provide contingency and/or to act in tandem. The tensioners 32a, 32b are secured to the vessel via the central modular beam structure 50 via conventional seafastening methods.

The pipeline connection machine 34 is secured into the system 10 via the central modular beam structure 50. In this example, the pipeline connection machine is a Zap-Lok Installation Press 8000Z, from Zaplok Pipeline Systems, Inc. However, in alternative embodiments, other pipeline connection systems may be used (including but not limited to alternative mechanical interference fit connection systems).

In an alternative embodiment, the pipeline connection machine 34 is located on a rail mounting system. Rail mounting enables the connection machine to travel forwards and aft-wards on the vessel where significant vessel surge is anticipated.

The auxiliary station 36 of this embodiment comprises two main functions. Primarily the station 36 is an anode fitting station, at which pipeline anodes are connected to the pipeline as it is assembled. Optionally, the station 36 can also be used for contingency cut out operations. For example, if the pipeline operation has been suspended and an abandonment and recovery (A&R) head has been fitted to the pipeline, on recovery of the pipeline, the A&R head can be removed at the anode station. The station 36 therefore comprises all necessary tooling and services to cut the A&R head and prepare the pipe end to allow pipe operations to continue. For example, at station 36, the cut end may be cold machined and a pin end may be prepared enabling a mechanical interference fit connection to be made up.

The central modular beam structure 50 also supports an assembly line conveyor system 54, which comprises a powered system of rollers configured to deliver pipe sections from an entry point to the assembly line to the pipelay equipment.

Figure 3:
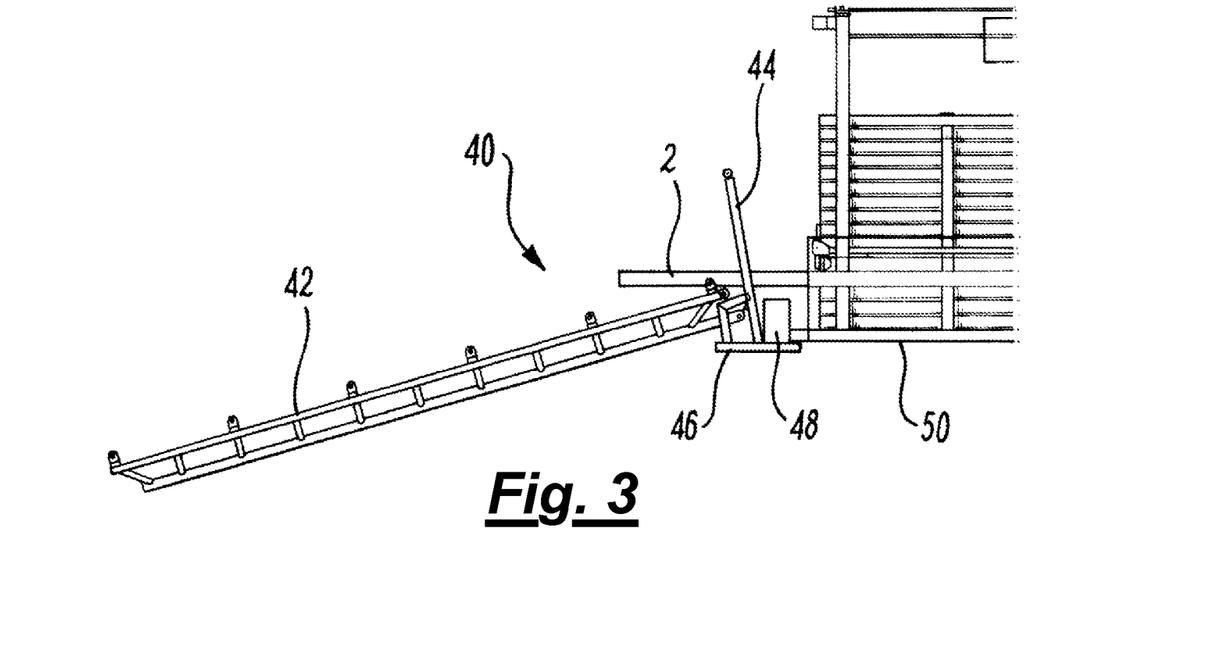
FIG. 3 is an enlarged, isometric view of a part of the system of FIG. 1, showing a stinger assembly and stinger foundation.

As shown in FIG. 3, the system 10 also comprises a stinger assembly 40, comprising stinger 42, A-frame 44, and a stinger foundation 46. The stinger assembly 40 is coaxial with the assembly line 30, and therefore the assembly line 30 also forms the firing line for the modular pipelay system from which the assembled pipeline 2 is deployed. The stinger 42 and the A-frame 44 are co-joined and are integrated with the integrated structure of the modular pipeline system. The stinger foundation 46 is integrated into the central modular beam system, such that loads on the stinger are distributed through the central modular beam system 50 and the integrated structure of the modular pipeline assembly as a whole.

The stinger 42 functions to prevent a sudden reduction in the forces supporting the assembled pipeline as it passes over the vessel stern. The stinger 42 is modular in construction with a removable tip section (not shown) which is used optionally to increase the length of the stinger. Typically, the length of the stinger with its tip extension is approximately 18 m, and without the tip extension is approximately 12 m to 15 m. Variations to the stinger dimensions may be made within the scope of the invention to optimise the stinger for the pipe size and specification. Shorter stingers or longer stingers may be selected according to water depth.

The stinger assembly 40 is rotatable into an upper transit position, shown in FIG. 1A, and a pipelay position, shown in FIG. 1B. The upper transit position enables increased transit speed and mitigates any potentially damaging forces on the stinger induced by vessel motion (and vice versa). The stinger assembly comprises a locking mechanism (not shown) which enables it to be secured in the transit position (FIG. 1A) or the pipelay position (FIG. 1B). The rotation between the transit position and the pipelay position is effected by the use of an abandonment and recovery winch 48. Use of the abandonment and recovery winch 48 for the movement of the stinger is convenient as it minimises the impact on deck space.

Figure 4:
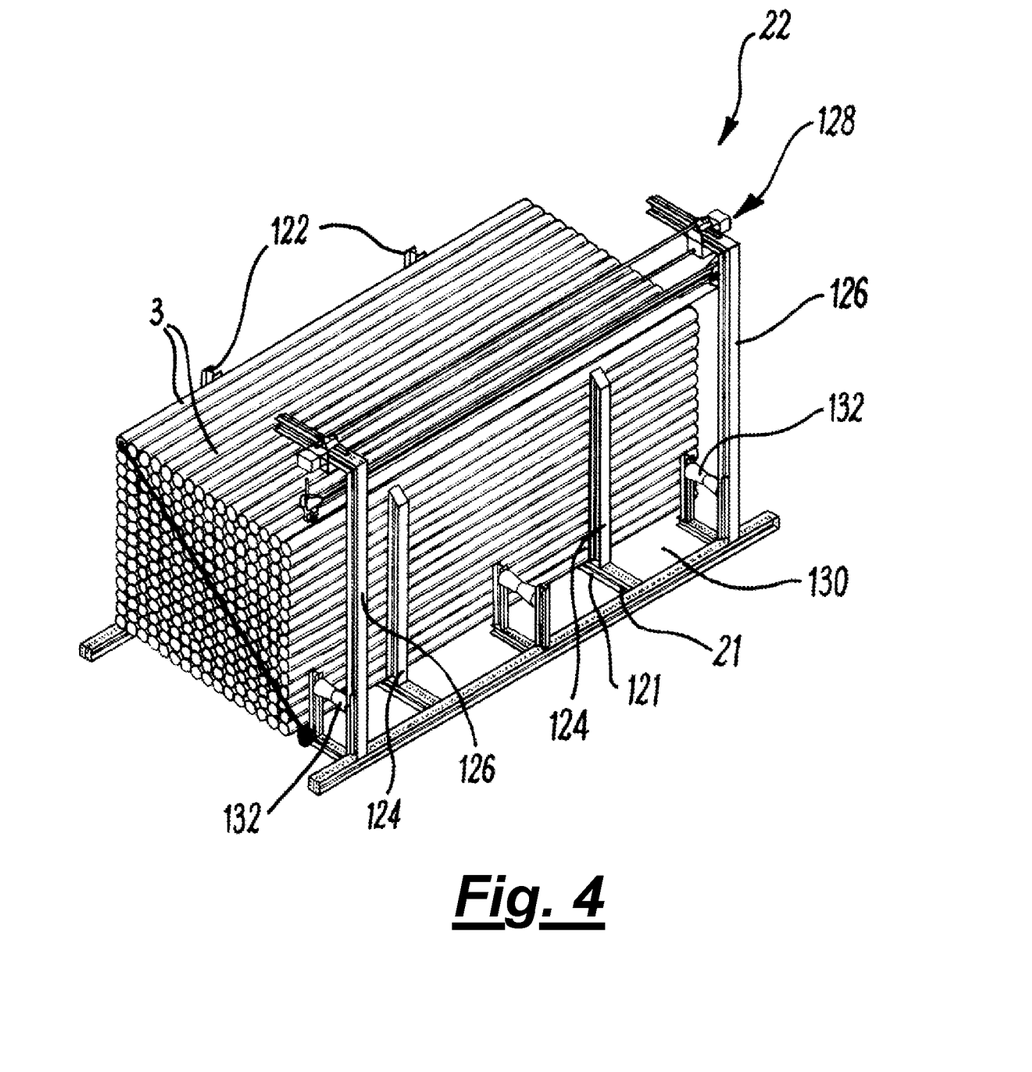
FIG. 4 is an isometric view of a primary storage apparatus according to an embodiment of the invention, and used in the system of FIG. 1.

Referring now to FIG. 4 in conjunction with FIG. 2, there is shown in more detail a primary pipe storage module 22. The module comprises base frame 21 made from longitudinal and transverse steel beams, and support a layered arrangement of pipe sections 3, defining a rack for the pipe sections. In FIGS. 2 and 4, the pipe storage module 22 accommodates a number of pipe sections 3 located in the rack in layers. Upright beams provide lateral restraints for pipe sections accommodated in the storage module, and comprise outboard lateral restraints 122, and inboard lateral restraints 124. Upright beams 126 support pipe lifting equipment, generally shown at 128, located towards the inboard side of the module 22.

Each pipe storage module 22 comprises a conveyor assembly 130. The conveyor system 130 is supported by lateral and upright support members, and are arranged to cooperate with conveyor assemblies (not shown) located in adjacent pipe storage modules. The conveyor assembly 130 comprises powered rollers 132, and is operable to transport a pipe section from the module 22 towards an end storage module 24 of the pipelay system. The powered conveyor assembly 130 also enables a pipe section received from an adjacent pipe storage module to be moved along system 10.

As most clearly shown in FIG. 2, the transverse beams 121 of the storage module are inclined towards the side of the module at which the lifting apparatus 128 is located (the inboard side). This facilitates movement of the pipe sections 3 towards the lifting apparatus 128 ready for lifting. In addition, the module 22 is provided with a tensioning line 134 installed on the outermost pipe section which tensions the pipe section towards the inboard side. When the last pipe section in a layer reaches the inboard lateral restraint, and the lifting connection is made (as will be described below), the tensioning line is disconnected and removed from the pipe section prior to the pipe being lifted. The tension line 134 may be reattached to the outermost pipe on the next layer of pipe sections, or alternatively the outermost pipes of each layer may be pre-installed with tension lines which are removed prior to lifting.

Figure 5:
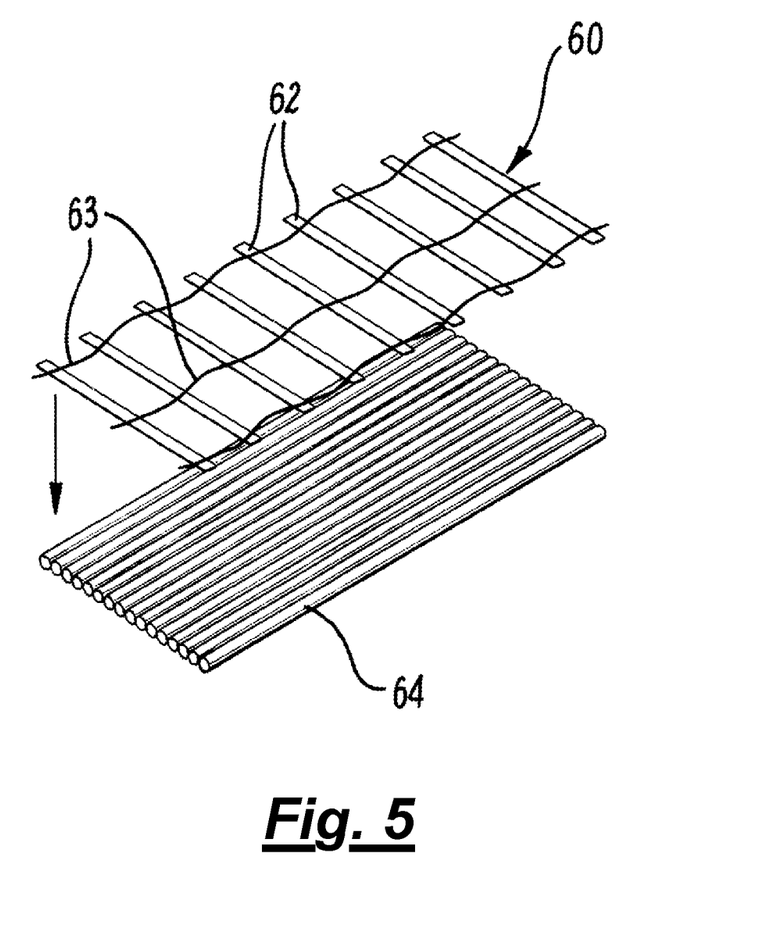
FIG. 5 is an isometric view of a protective mattress according to an embodiment of the invention.

Between each layer of pipe sections is provided a pre-engineered protective layer, in the form of a protective mattress, shown generally at 60 in FIG. 5. The protective mattress 60 comprises a number of lateral wooden slats 62 which run perpendicular to the lengths of pipe 3. The slats 62 are joined to one another by a flexible rope 63 (for example, polypropylene rope) to keep the slats together to form a layer. The protective mattress 62 protects a layer of pipe 64 beneath the mattress from the weight and forces the layers of pipe in the rack located above the mattress. The protective mattress also provides a smooth rolling surface for the pipe sections as they move from their initial position towards the pipe lifting position against the inboard restraints 124. The lowermost layers of pipe section experience the greatest loads due to the higher number of layers located above the mattress. Protective mattresses between lowermost layers may therefore be designed to provide a greater degree of protection (for example by including thicker wooden slats) than those designed to be located between layers higher in the rack. The protective mattresses may be graded such that their level of protection is optimised for a particular location in the rack with pipe sections. In use, when the last pipe section from the layer is lifted, the mattress 62 will be removed and stored for later use in a subsequent rack.

There will now be described with reference to FIGS. 6A to 6D, the features and operation of the lifting apparatus 128 of the module 22. The lifting apparatus 128 is supported by upright beams 126 and comprises a powered crane assembly 136 controllably movable on lateral supports 140. The power crane can be moved along the lateral support between an inboard position (where it is located above the conveyor assembly 130) and an outboard position in which it is located over an inboard end of a layer of pipe sections. A latching mechanism 142 is provided at each end of the crane assembly 136, and is configured to be located into opposing ends of a pipe section 3. The latching mechanism 142 is selected to engage with the ends of the particular pipe section used in the pipelay system (in this case mechanical interference fit connections).

Figure 6A:
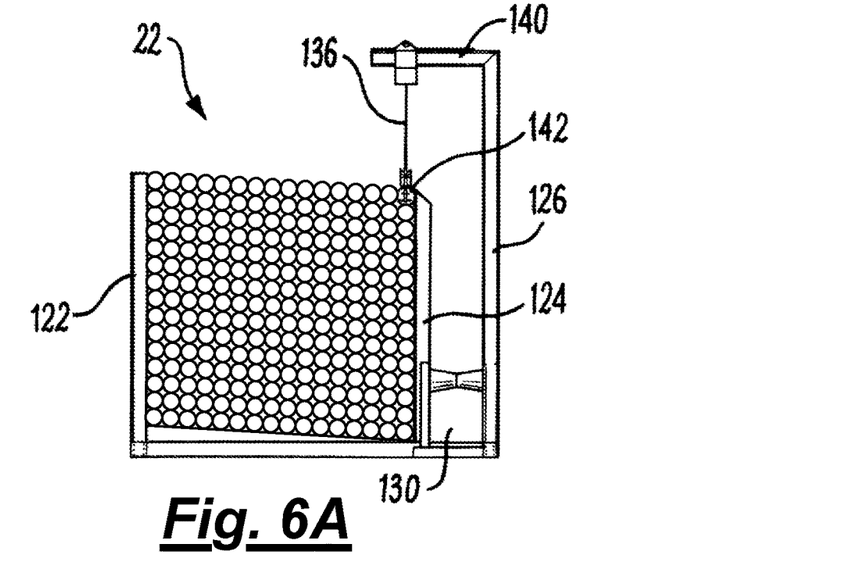
FIGS. 6A to 6D are schematic representations of a pipe lifting method and apparatus used with the primary storage apparatus of FIG. 4.
Figure 6B:
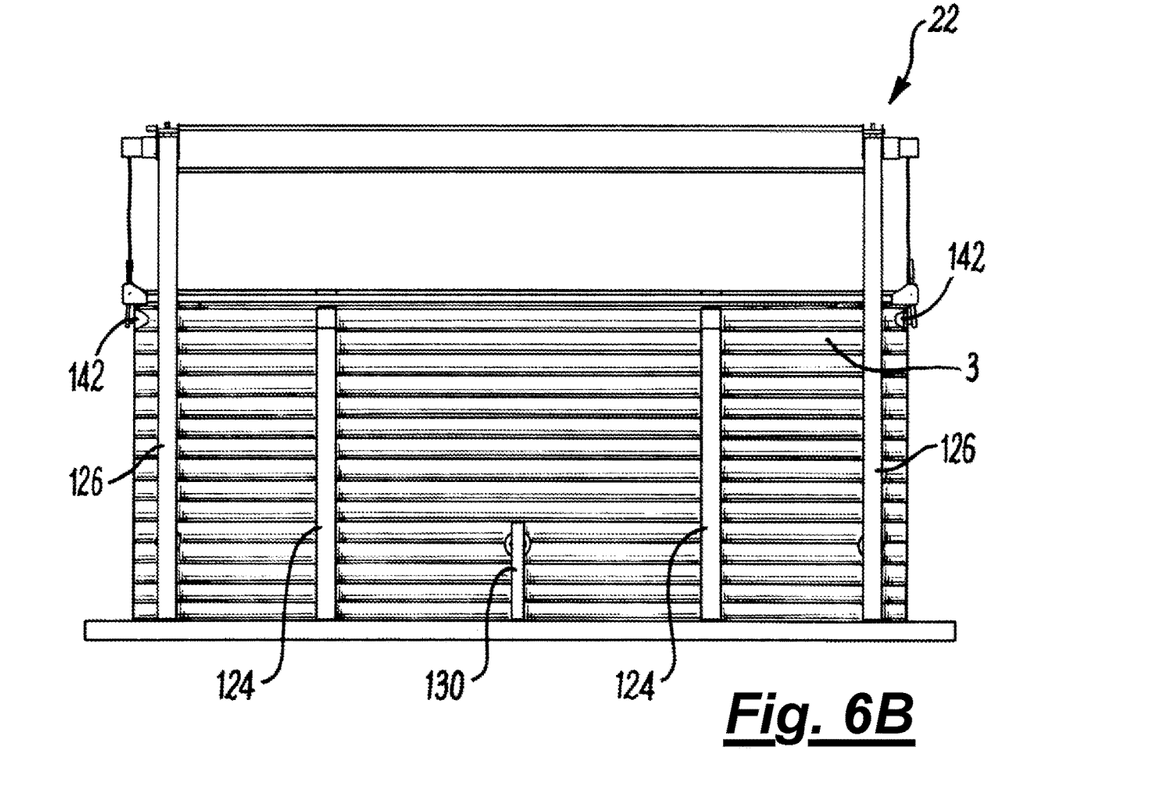

FIG. 6A shows the crane assembly lowered into position and the latch mechanisms engaging with the innermost pipe in the upper layer of the rack. FIG. 6B is a schematic side view which shows the crane assembly 136 engaged into the pipe section and ready for lifting.

Figure 6C:
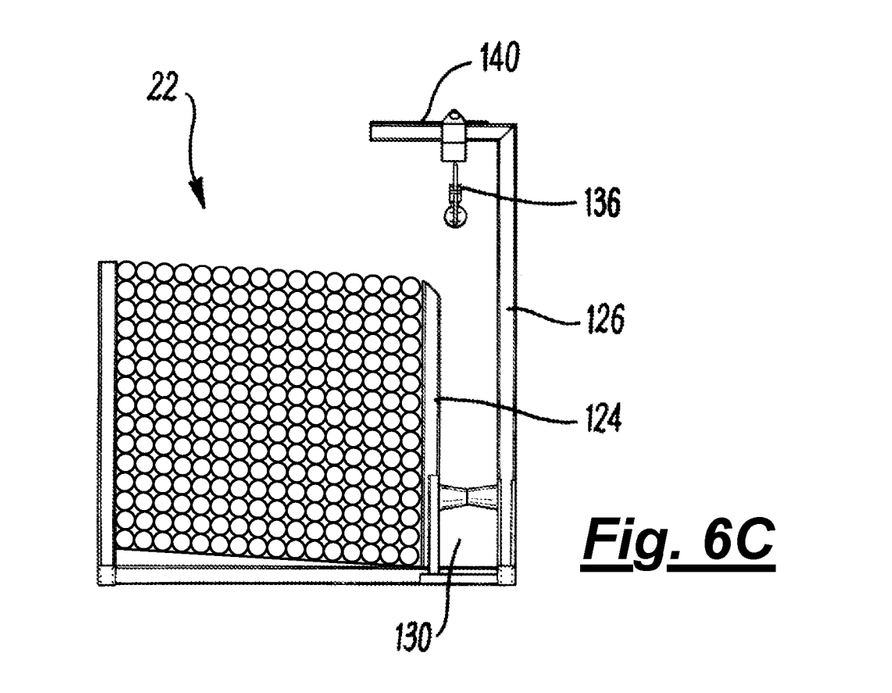
Figure 6D:
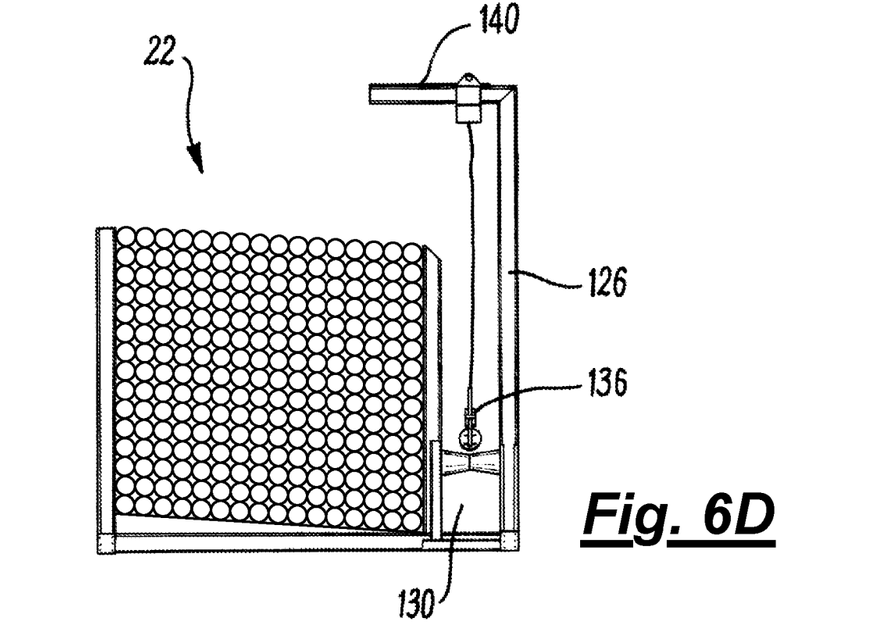

When the latching mechanism is engaged in the pipe section, the crane assembly is remotely controlled to power lift the pipe section 3 out of the rack and vertically clear of the inboard lateral restraint 124. The crane assembly is moved in an inboard direction towards the conveyor assembly 130 until the pipe is clear of the inboard lateral restraint 124, as shown in FIG. 6C. The crane assembly is then operated to lower the pipe section to the rollers of the conveyor assembly 130, in the position shown in FIG. 6D.

During movement of the pipe section from the rack storage location to the conveyor assembly 130, the upright beams 126 and the inboard lateral restraints 124 provide a guide path for the pipe section. An upper end of the inboard lateral restraint 124 is angled to facilitate guiding of a pipe section lowered onto the conveyor assembly in an inboard direction.

With the pipe section in position on the rollers of the conveyor assembly 130, the latching mechanism 142 is operated to release the pipe section and allow it to be moved by the conveyor assembly to an adjacent module. The lifting equipment of the module 122 is provided with a safety mechanism to avoid placing the pipe section on the conveyor assembly if the powered conveyor rollers are being operated.

Figure 7A:
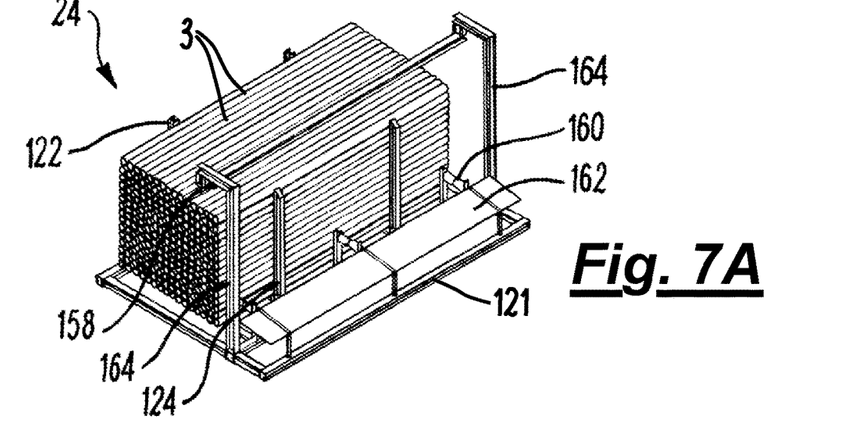
FIGS. 7A to 7C are respectively isometric, end and side views of an end storage assembly in accordance with an embodiment of the invention.
Figure 7B:
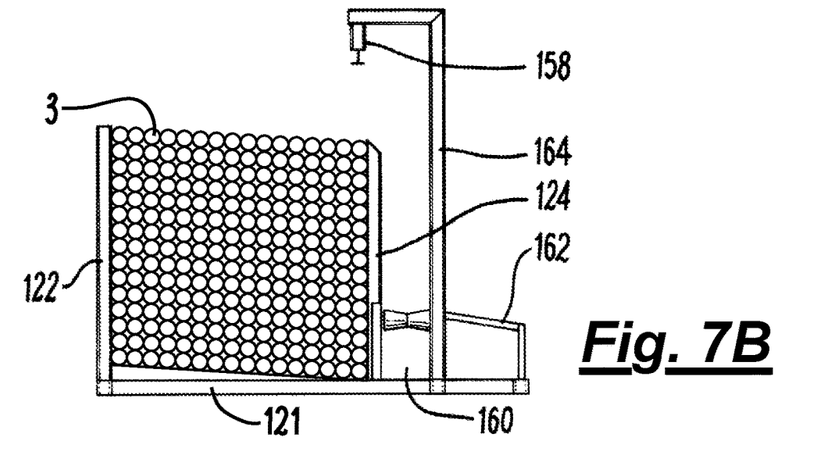
Figure 7C:
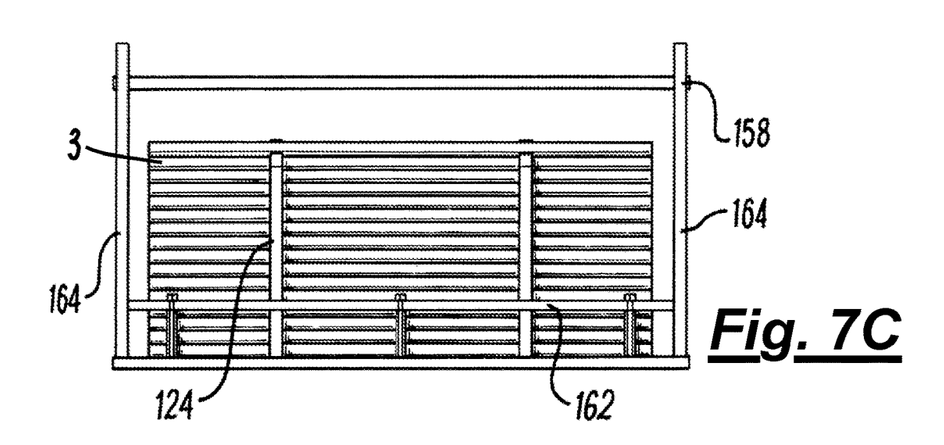

FIGS. 7A to 7C show an end storage module 24 in more detail, respectively in isometric, end and side views. The module 24 is similar to the primary storage module 22, and comprises a base frame 121 formed from longitudinal and transverse steel beams. As with the module 22, the module 24 defines a rack for pipe sections 3 arranged in layers on the transverse beams between outboard and inboard lateral restraints 122 and 124. The module 24 also comprises an inclined base profile to cause pipe sections to roll towards an inboard side of the module. Lifting equipment 158 is provided to move the pipe section from the storage rack to a conveyor assembly 160. However, the module 24 differs from the module 22 in a number of respects.

Firstly, the conveyor assembly 160 of the module 24 is not a powered conveyor assembly. Instead, the conveyor assembly 160 comprises free running rollers which cooperate with a powered conveyor assembly of an adjacent storage module 22, to receive a pipe section from the adjacent module. It will be appreciated that in alternative embodiments, end modules may comprise conveyor systems with powered rollers if desirable (for example to return a pipe section to an adjacent storage module 22).

In addition, the module 24 comprises a feed table 162 to enable lateral movement of a pipe section from the conveyor assembly 160 to the assembly line 30 of the pipelay system. The feed table 162 comprises a planar surface, inclined towards an inboard direction so that a pipe section on the feed table rolls towards the assembly line 30 at the inboard side of the module 24.

The requirement for lateral movement of the pipe section to the assembly line from the module 24 necessitates some modifications to the lifting equipment 158. In particular, the upright beams 164 which support the lifting equipment are longitudinally spaced from one another by distance which is greater than a length of a pipe section. This allows the upright beams 164 to be clear of a pipe section and enable it to be moved onto the feed table into the assembly line without restriction. In other respects, the lifting equipment of the module 24 operates in a similar manner to the module 22, as described with reference to FIGS. 6A to 6D.

Figure 8:
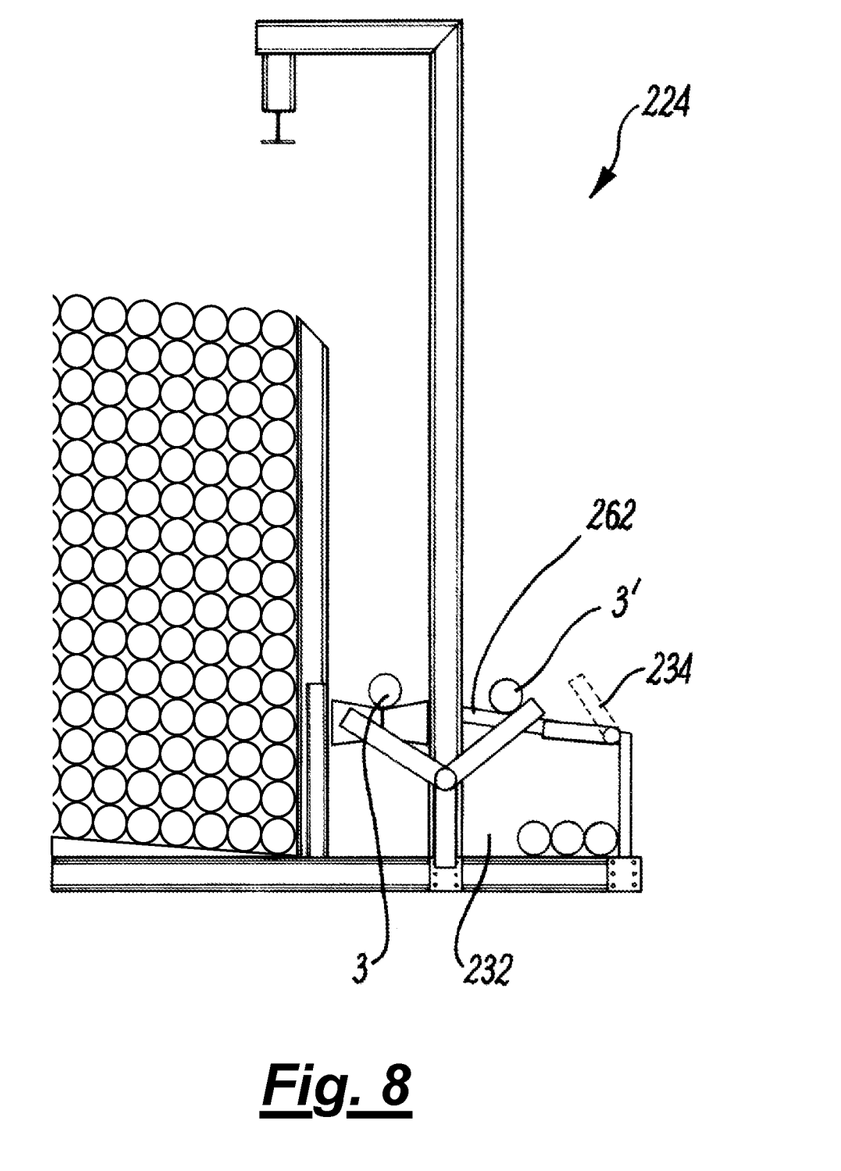
FIG. 8 is a schematic representation of an end module and feed mechanism according to a further alternative embodiment of the invention.

FIG. 8 is an end view of an end storage module according to a further embodiment of the invention. The end storage module 224 is similar to the end storage module 24, and will be understood from FIGS. 7A and 7C and the accompanying description. However, the module 224 comprises additional features as described below.

The feed table 262 of the module 224 incorporates a feed mechanism for automatically moving a pipe section from the conveyor assembly 260 of the module into the assembly line (not shown). The feed mechanism, generally depicted at 230, comprises a pair of three-spoked rotating vanes which engage a pipe section 3 located on the conveyor assembly 160 and move it to a position on the feed table 162. When on the feed table, the pipe section 3' is inspected to enable any damaged pipe to be rejected. Rejected pipe can be moved to a secondary storage location 232 beneath the feed table 162, by opening a hatch 234 on the feed table and transferring the pipe section into the secondary storage section.

Alternative mechanisms may be used to achieve controlled and/or automated lateral movement of the pipe sections from the end storage module to the assembly line. For example, a belt or chain driven mechanism may be used in combination with suitable stop or restraining members to allow inspection and selection/rejection of pipe sections.

Figure 9:
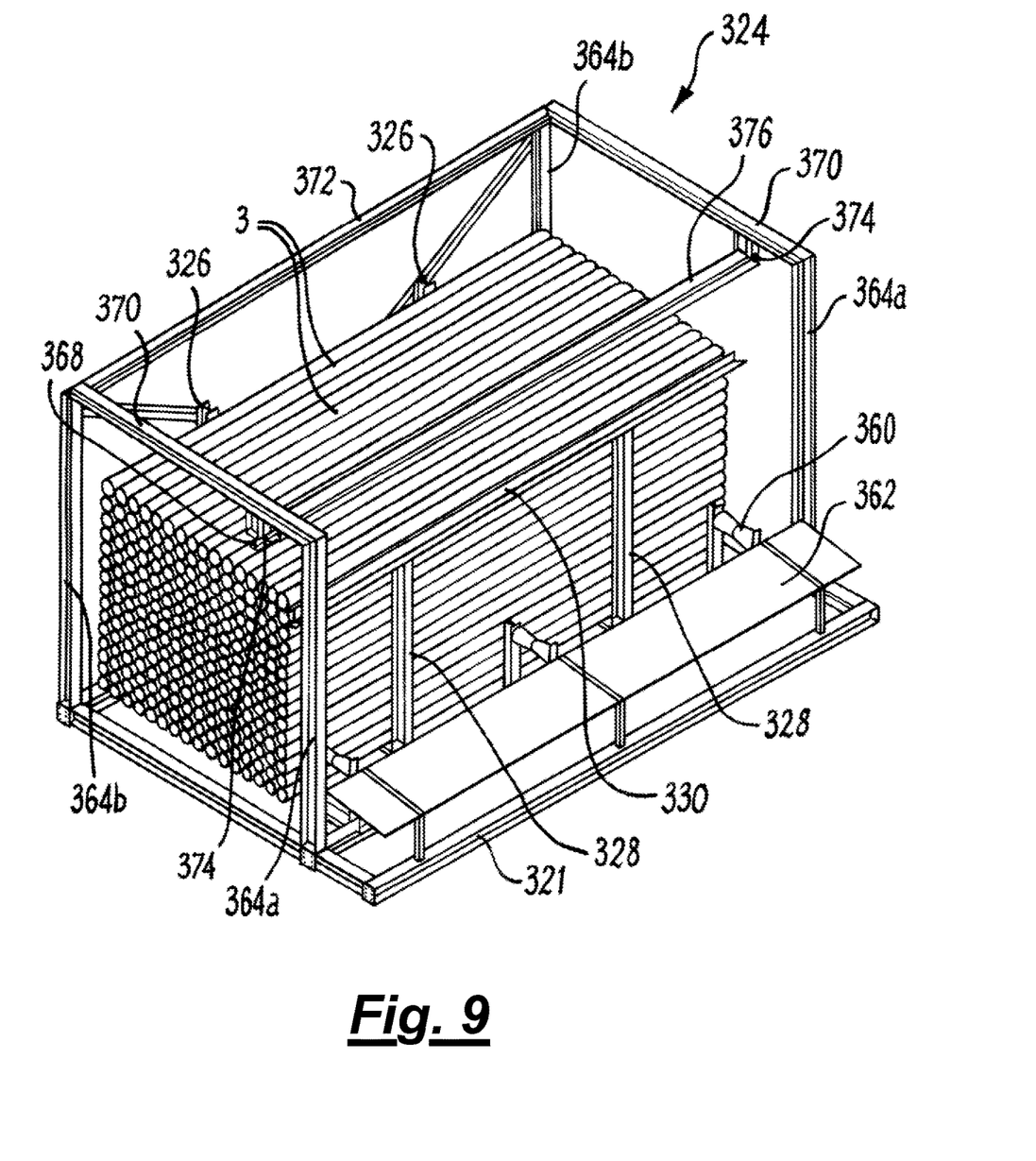
FIG. 9 is an isometric view of an end storage assembly in accordance with an alternative embodiment of the invention.

Referring now to FIG. 9, there is shown an end storage module 324 according to an alternative embodiment of the invention. The end storage module 324 is similar to the end storage modules 24 and 224, and will be understood from FIGS. 7A, 7C, 8 and the accompanying description. The module 324 comprises a base frame 321 formed from longitudinal and transverse steel beams, which in this example are I-beams. As with the modules 22, 24 and 224, the module 324 defines a rack for pipe sections 3 arranged in layers on the transverse beams of the base frame 321, between outboard and inboard lateral restraints 326 and 328. The module 324 also comprises a horizontal lateral restraint beam 330.

A conveyor assembly 360 comprises free running rollers which cooperate with a powered conveyor assembly of an adjacent storage module 22, to receive a pipe section from the adjacent module, and a feed table 362 to enable lateral movement of a pipe section from the conveyor assembly 360 to the assembly line of the pipelay system.

In contrast with the previously described embodiments, module 324 comprises two pairs of upright beams 364a, 364b, which are longitudinally spaced from one another by a distance which is greater than the length of a pipe section 3. This allows the respective pairs of upright beams to be clear of the pipe section, and allows the inboard beams 364a to support the lifting equipment 368 without obstructing inward movement of a pipe section 3 into the assembly line.

In contrast with previous embodiments, the upright beams support horizontal carrier beams 370 which extend transversely from the inboard side of the module 324 to the outboard side of the module 324 across the extent of the pipe rack. The horizontal carrier beams 370 function to support the lifting equipment 368 and permit its movement across the transverse extent of the pipe rack. Accordingly, it is possible to position the lifting equipment 368 vertically above any pipe section 3 located in the pipe rack. A longitudinal horizontal beam 372 is provided between the two outboard uprights 364b.

In this embodiment, the lifting equipment 368 comprises the first and second hoists 374, located respectively on the first and second horizontal carrier beams 370, joined by a lifting beam 376. The hoists 374 are radio controlled by an operator to move over the transverse dimension of the pipe rack, and the first and second hoists are indexed such that their transverse movement is synchronised and the lifting beam 370 remains at least substantially parallel to the pipe sections 3. Similarly, operation of the hoists 374 to be lowered for engagement with a pipe section 3 and raised to lift a pipe section 3 is indexed so that the movement of the individual hoists is synchronised.

The module 324 provides additional benefits compared with the modules of previous embodiments. Firstly, the box-like structure defined by the upright beams and horizontal beams, increases the integral strength of the structure, proving its resistance to static and dynamic loads.

Secondly, the module provides full transverse movement of the lifting equipment to enable it to access any pipe section on the pipe rack. This avoids a requirement to provide an inclined surface at the bottom of the pipe rack, which is used in previous embodiments to cause pipe sections to roll inboard to a point at which they can be lifted. Instead, individual pipe sections can be located in shaped cradles or supports which support the pipe sections in the rack and prevent lateral movement. This provides a more regimented arrangement of the pipe sections on the rack and reduces forces transferred from the pipe sections to the lateral restraints of the module. Furthermore, negating the requirement for the pipe sections to roll avoids potential problems with the pipes becoming stuck and mitigates any potential safety concerns associated with rolling the pipe sections.

The module 324 is shown with a feed table 362 for lateral movement of a pipe section into an assembly line. It will be appreciated that the box-like structure and/or the use of lifting equipment capable of moving across the extent of the pipe rack may also be implemented in a storage module which does not include a feed table. For example, the configuration shown can be used to provide a storage module which functions similarly to module 22, and may be provided with a powered conveyer to allow the pipe section to be conveyed to an adjacent module.

Use of the pipelay system 10 will now be described. With the system 10 installed on the vessel on the pipelay installation location, the stinger assembly is lowered to its pipelay position, as shown in FIG. 1B, by paying out the winch 48 coupled to the A-frame 42. A first pipe section is lifted from a selected pipeline storage module 20, by using the automated lifting mechanism described with reference to FIG. 6A to 6D, to move the pipe section from a rack onto the respective conveyor assembly of the module. The powered conveyor assembly causes movement of the pipe section through the conveyor assemblies of adjacent modules to the conveyor assembly of the end storage module 24. At the end storage module, the pipe section is transferred via the feed table into the assembly line, on to the assembly line conveyor. The assembly line conveyor is operated to move the pipe section aft-wards along the assembly line to the pipeline connection equipment, beginning with the pipeline connection machine 34. Second and subsequent pipe sections follow the same path along the conveyor system to the end storage modules 24 and are moved laterally into the assembly line conveyor, and the assembly line conveyor moves the second and subsequent pipe section towards the first so that the two pipeline sections may be connected together in the pipe connection machine 34. The process repeats continuously as the pipeline is assembled and is passed through the tensioners and auxiliary station 36 and towards the stinger assembly. The assembled pipeline is passed over the stern in an S-lay configuration and lowered to the seabed.

The invention provides a modular system for use in an offshore pipelay operation, and apparatus and a method of use. The system comprises a plurality of pipe storage modules, each comprising a rack for accommodating a plurality of pipeline sections. The pipe storage modules are configured to be assembled together to form an integrated structure on a deck of a vessel.

The invention offers a number of advantages with respect to conventional pipelay methodologies. The modularity of the system enables individual modules to be readily transported to a vessel location, for example by road or rail, for installation onto the vessel. The system enables a wide range of vessels to be used in pipelay vessel operations.

Each module may be adjusted in width and height to suit the available deck space of the vessel, and pipe storage racks are adjustable in height to suit pipe storage requirements.

Assembly of the various components of the system is standardised to facilitate fast mobilisation and demobilisation.

The system uses mechanised and automated lifting and handling equipment for pipe handling, thereby minimising the involvement of personnel. This improves the safety and efficiency of the pipelay operation. The conveyor system also facilitates the safe movement of pipe on the back deck of a vessel without the use of a conventional vessel crane.

Various modifications may be made to the above-described embodiments within the scope of the invention, and the invention extends to combinations of features other than those expressly claimed herein.

The invention claimed is:

1. A modular system for use in an offshore pipelay operation, the system comprising:

a plurality of pipe storage modules, each pipe storage module comprising a rack for accommodating a plurality of pipeline sections;

wherein the pipe storage modules are structurally assembled together to form an integrated structure removably securable to a deck of a vessel;

wherein each pipe storage module comprises a respective conveyor assembly, the respective conveyor assemblies configured to be connected together to form a continuous conveyor assembly; and wherein the modular system further comprises a stinger assembly comprising a stinger foundation, located at a pipelay end of an assembly line, and wherein the stinger foundation forms a part of the integrated structure formed by the assembly of the pipe storage modules on the deck of the vessel, such that a load on the stinger assembly is transferred to the integrated structure.

2. The modular system according to claim 1, wherein one or more of the pipe storage modules is configured to be transported overland by road and/or rail in a standard shipping container.

3. The modular system according to claim 1, wherein the assembly line is supported by the integrated structure formed by the assembled pipe storage modules on the deck of the vessel.

4. The modular system according to claim 1, further comprising a plurality of modular beams configured to be assembled into a central modular beam structure of the integrated structure, wherein the central modular beam structure is arranged to extend over the majority of the length of a deck on which the system is assembled.

5. The modular system according to claim 1, wherein the integrated structure formed by the assembly of the pipe storage modules comprises one or more base foundations accommodating and/or locating pipeline connection equipment.

6. The modular system according to claim 5, wherein the pipeline connection equipment accommodated and/or located on the one or more base foundations comprises one or more machines for forming a mechanical interference fit connection between pipe sections.

7. The modular system according to claim 1, wherein a pipe storage module of the plurality of pipe storage modules comprises pipe lifting equipment configured to lift a pipe section accommodated on a rack of the pipe storage module.

8. The modular system according to claim 1, wherein the plurality of pipe storage modules comprises at least one primary storage module, and the primary storage module comprises a conveyor assembly, configured to move a pipeline section towards a pipeline connection location, and wherein the conveyor assembly comprises a powered conveyor mechanism.

9. The modular system according to claim 1, wherein the plurality of pipe storage modules comprises at least one end storage module, and wherein the or each end storage module comprises a feed table configured to move a pipeline section towards the assembly line.

10. The modular system according to claim 1, wherein the integrated structure is a load-bearing structure, such that a load on one pipe storage module is distributed through the integrated structure.

11. A method of installing a pipeline from an offshore vessel, the method comprising:

providing a plurality of pipe storage modules on the deck of a vessel, the pipe storage modules accommodating a plurality of pipe sections in layers, wherein the plurality of pipe storage modules comprises a first pipe storage module with a first conveyor assembly and a second pipe storage module with a second conveyor assembly, the second conveyor assembly being distinct from the first conveyor assembly;

connecting the first pipe storage module to the second pipe storage module such that the conveyor assemblies of the first pipe storage module and the second pipe storage module form a continuous conveyor assembly;

moving a pipe section from a storage rack of the second pipe storage module to the second conveyor assembly of the second pipe storage module;

moving the pipe section from the second conveyor assembly of the second pipe storage module to the first conveyor assembly of the first pipe storage module;

moving the pipe section into an assembly line on the deck of the vessel;

assembling the pipe section into a pipeline; and laying the pipeline from the vessel to a subsea location.

12. The method according to claim 11 wherein moving the pipe section from a storage rack of the second pipe storage module to the conveyor assembly of the second pipe storage module comprises using a powered lifting apparatus, wherein the powered lifting apparatus is a part of the second pipe storage module.

13. The method according to claim 11 comprising:
providing a plurality of primary storage modules and an end storage module; and
moving a pipe section through the conveyor assemblies of the plurality of primary storage modules to the conveyor assembly of the end storage module.

14. The method according to claim 11 comprising assembling a plurality of pipe sections into a pipeline using a mechanical interference fit connection method.

15. The method according to claim 11, comprising providing an end storage module, and moving a pipe section towards the assembly line in a direction perpendicular to the assembly line using a feed table on the end storage module.

16. The method according claim 11 comprising providing an end storage module, and moving a rejected pipe section to a secondary storage area in the end storage module using a mechanism in the end storage module.

* * * * *